US008433328B2

(12) United States Patent
Kawamura et al.

(10) Patent No.: US 8,433,328 B2
(45) Date of Patent: Apr. 30, 2013

(54) BASE STATION APPARATUS, USER APPARATUS, AND METHOD OF ALLOCATING REFERENCE SIGNAL SEQUENCES

(75) Inventors: Teruo Kawamura, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 566 days.

(21) Appl. No.: 12/664,669

(22) PCT Filed: Jun. 17, 2008

(86) PCT No.: PCT/JP2008/061043
§ 371 (c)(1),
(2), (4) Date: Apr. 14, 2010

(87) PCT Pub. No.: WO2009/001713
PCT Pub. Date: Dec. 31, 2008

(65) Prior Publication Data
US 2010/0189058 A1    Jul. 29, 2010

(30) Foreign Application Priority Data
Jun. 27, 2007  (JP) .................... 2007-169793

(51) Int. Cl.
*H04W 72/00* (2009.01)
(52) U.S. Cl.
USPC ..... 455/450; 455/451; 455/452.1; 455/452.2; 455/422.1; 455/403; 370/329
(58) Field of Classification Search ............. 455/450, 455/451, 452.1, 452.2, 422.1, 403; 370/329
See application file for complete search history.

(56) References Cited

U.S. PATENT DOCUMENTS

2010/0317359 A1* 12/2010 Suga .............................. 455/450
2012/0021754 A1*  1/2012 Ogawa et al. ................. 455/450

OTHER PUBLICATIONS

International Search Report w/translation from PCT/JP2008/061043 dated Jul. 29, 2008 (4 pages).
Written Opinion from PCT/JP2008/061043 dated Jul. 29, 2008 (3 pages).
3GPP TSG RAN WG1#49bis; R1-072848; "Design of CAZAC Sequences for Small RB Allocations in E-UTRA UL"; Texas Instruments; Orlando, USA; Jun. 25-29, 2007 (8 pages).
3GPP TSG RAN WG1 Meeting #49; R1-072083; "Reference signal generation and selection for E-UTRA uplink"; Panasonic; Kobe, Japan; May 7-11, 2007 (4 pages).
3GPP RAN WG1 #47; R1-063057; "EUTRA SC-FDMA Uplink Pilot/Reference Signal Design"; Motorola; Riga, Latvia; Nov. 6-10, 2006 (5 pages).
3GPP TR 25.814, V7.0.0; "Physical layer aspects for evolved Universal Terrestrial Radio Access (UTRA)"; Jun. 2006 (126 pages).
3GPP TS 36.211, V1.0.0; "Physical Channels and Modulation"; Mar. 2007 (30 pages).

* cited by examiner

*Primary Examiner* — Nghi H Ly
(74) *Attorney, Agent, or Firm* — Osha Liang LLP

(57) ABSTRACT

A base station apparatus is disclosed which communicates with a user apparatus which transmits an uplink signal using a single-carrier scheme. The base station includes a sequence-identifier determining unit which performs scheduling to allocate a frequency based on an uplink channel reception state of the user apparatus, and which determines a second sequence identifier for use by the user apparatus based on a first sequence identifier in a length of a reference signal sequence for transmitting in a maximum bandwidth in which the user apparatus can transmit, and a frequency bandwidth allocated to the user apparatus.

9 Claims, 6 Drawing Sheets

BASE STATION APPARATUS, USER APPARATUS, AND METHOD OF ALLOCATING REFERENCE SIGNAL SEQUENCES

BACKGROUND OF THE INVENTION

1. Field of the Invention

The present invention generally relates to radio communications systems, and particularly relates to base station apparatuses, user apparatuses, and methods of allocating reference signal sequences.

2. Description of the Related Art

As a communications scheme to succeed W-CDMA (Wideband Code Division Multiple Access) and HSDPA, Long Term Evolution (LTE) is being studied in a W-CDMA standardization body called 3GPP. Moreover, as radio access schemes, OFDM is being considered for downlink, while SC-FDMA (Single-Carrier Frequency Division Multiple Access) is being considered for uplink (see Non-patent document 1, for example).

The OFDM, which is a scheme for dividing a frequency band into multiple narrow frequency bands (sub-carriers) and overlaying data onto the respective frequency bands for transmission, densely arranges the sub-carriers on the frequency axis such that one sub-carrier partially overlaps another sub-carrier without their interfering with each other, making it possible to achieve high-speed transmission and to improve frequency utilization efficiency The SC-FDMA is a transmission scheme which divides a frequency bandwidth and transmits using different frequency bands among multiple terminals to make it possible to reduce interference between the terminals. The SC-FDMA, which features a reduced variation in transmission power, makes it possible to achieve wide coverage as well as low power consumption of the terminals.

A reference signal for uplink in E-UTRA refers to a pilot channel, and is used for synchronizing, channel estimating for coherent detection, and measurement of received SINR at the time of power control. The reference signal is a known transmission signal at the receiver, is embedded in each subframe, and is received at the base station.

In the W-CDMA, a signal sequence used for the reference signal (pilot channel) is a user-specific PN sequence, or, more precisely, a sequence such that long-period Gold and orthogonal sequences are multiplied. Moreover, many types of sequences may be created due to their great lengths. However, there is a problem that the channel estimation accuracy is reduced as the PN sequence is not superior in the correlation characteristics. In other words, when the pilot channel is transmitted, interference with pilot channels of other users becomes large. Moreover, delay waves in a multi-path cause a large auto-correlation problem with the pilot channel sequence. The W-CDMA provides for a simple reception process such as RAKE, while E-UTRA is designed based on the premise that highly-accurate channel estimation means such as an equalizer is used to suppress multi-path interference. Thus, in E-UTRA, a CAZAC (Constant amplitude and zero auto-correlation) sequence is used in lieu of the user-specific PN sequence (see Non-Patent document 2).

The CAZAC sequence, which is superior in code auto-correlation and cross-correlation characteristics, makes it possible to achieve highly-accurate channel estimation, allowing a significantly-improved demodulation accuracy in comparison with a case of using the PN sequence. The CAZAC sequence, having small signal amplitude variations in both frequency and time domains, is relatively flat. The PN has a large amplitude variation in the frequency domain. Thus, the CAZAC sequence may be used to make it possible to accurately perform channel estimation using an equalizer. Moreover, the CAZAC sequence makes it possible to suppress the effect of the multi-path to a small level since the auto-correlation of the transmitted sequence becomes zero.

However, the CAZAC sequence has the following problems. A small number of sequences: as it is not possible to make it be a user-specific sequence, cell repetition is needed for the sequences. The number of sequences becomes small when the transmission bandwidth is small, particularly in the SC-FDMA. When the transmission bandwidth is small in the SC-FDMA, in particular, the symbol rate becomes small, so that the length of the CAZAC sequence is reduced. In other words, in E-UTRA, the reference signal is inserted in time multiplexing. Thus, when the transmission bandwidth is small, the symbol rate becomes low, so that the sequence length becomes small. The number of sequences becomes the same as the length of the sequences. For example, for a bandwidth of 180 kHz and the number of symbols of 12, it is not possible to make the sequences user-specific, so that 12 sequences must be periodically allocated in the same cell so that they don't overlap. The cross-correlations between the CAZAC sequences of different sequence lengths have a relatively large variance depending on the combination. Thus, when the cross-correlation is large, the channel estimation accuracy is reduced.

Next, the SC-FDMA used for uplink radio access in E-UTRA is described with reference to FIG. 1. The frequency bandwidth available for use by a system is divided into multiple resource blocks, each of which includes at least one sub-carrier. At least one resource block is allocated to user equipment (UE). In frequency scheduling, resource blocks are preferentially allocated to terminals with good channel conditions depending on received signal quality or channel condition information (CQI) per resource block of a downlink pilot reported from a user apparatus. Moreover, frequency hopping may be applied which changes a frequency block available for use depending on a predetermined frequency hopping pattern.

In FIG. 1, different hatchings indicate time/frequency resources allocated to different users. UE2, which is allocated a larger bandwidth, is going to be allocated a small bandwidth in the following sub-frame. Different frequency bandwidths are allocated to the users so that there is no overlap.

In the SC-FDMA, the users in a cell transmit using different time and frequency resources. In this way, the users within the cell are made orthogonal. A minimum unit for the time and frequency resources is called a resource unit (RU). In the SC-FDMA, successive frequencies are allocated to achieve low PAPR (peak-to-average power ratio) single-carrier transmission. In the SC-FDMA, the base station scheduler determines the time and frequency resources to be allocated based on a propagation state of each user, and QoS (Quality of Service) of data to be sent. Here, the QoS includes a data rate, a predetermined error rate, and a delay. In this way, time and frequency resources may be allocated to each user with a good propagation condition to increase throughput.

Each of the base station apparatuses individually performs time and frequency resource allocations. Thus, a bandwidth allocated in one cell may overlap with a part of a bandwidth allocated in an adjacent cell. In this way, when there is an overlap with the part of the bandwidth allocated in the adjacent cell, interference occurs, leading to degradation across the cells.

Next, a reference signal in the uplink SC-FDMA is described with reference to FIG. 2. FIG. 2 shows an exemplary frame configuration.

The length of a TTI packet called a sub-frame is 1 ms. the sub-frame includes 14 blocks to undergo FFT, two of which are used for transmitting the reference signal and the remaining 12 of which are used for transmitting data.

The reference signal undergoes time-division multiplexing (TDM) with the data channel. The transmission bandwidth varies dynamically according to instructions from the base station apparatus through frequency scheduling. Thus, the lower the transmission bandwidth the lower the symbol rate, so that the sequence length of the reference signal transmitted in a fixed time length becomes small, while the larger the transmission bandwidth the higher the symbol rate, so that the sequence length of the reference signal transmitted in the fixed time length becomes large. For a narrow bandwidth (for example, when the reference signal is transmitted as one resource unit, or 12 sub-carriers, or 180 kHz), the number of symbols becomes 12. Thus, the sequence length becomes approximately 12 and so does the number of sequences. On the other hand, for a wide bandwidth (for example, when the reference signal is transmitted as 25 resource units, or 300 sub-carriers, or 4.5 MHz), the number of symbols becomes 300. Thus, the length of sequence becomes approximately 300 and so does the number of sequences.

Non-Patent Document 1
3GPP TR 25.814 (V7.0.0), "Physical Layer Aspects for Evolved UTRA," June 2006

Non-Patent Document 2
3GPP TS 36.211 (V1.0.0), March 2007

SUMMARY OF THE INVENTION

Problems to be Solved by the Invention

However, the related art as described above has the following problems.

When the same frequency bandwidth is being used in the same frequency band in an own cell and an interfering cell, the cross-correlation (interference) of the reference signal using the CAZAC sequence scheme is suppressed to a very small level, so that a good communications quality is obtained.

However, in the SC-FDMA, the frequency band and the frequency bandwidth which are used by each user changes every moment depending on the scheduling result, so that it is rather unlikely that a user is assigned the same frequency bandwidth in the same frequency band as the interfering station. In other words, the frequency band may often differ from that of the interfering station even when the frequency bandwidth is the same. In this case, the interference is the correlation between the CAZAC sequences of different bandwidths. Thus, any occurrence of a combination of sequences that causes large interference may reduce the communications quality. Here, as the number of types of CAZAC sequences used for the reference signal is small, a sequence specific to each cell is allocated. However, when one CAZAC sequence is always used depending on the frequency bandwidth in each cell, any occurrence of a poor combination of the frequency bandwidth with the interfering cell may lead to continuously large interference in all frames, causing a large reduction in the communications quality. In the W-CDMA, the period of the reference signal is very large. Thus, it is expected that the size of interference becomes smaller even in a frame subsequent to a frame in which large interference occurs by chance.

As described above, the number of types of sequences in the reference signal using the CAZAC sequence scheme is small. Thus, a sequence specific to each cell is allocated. The number of sequences is proportional to the frequency bandwidth allocated, and is generally equivalent to the sequence length. Therefore, in the E-UTRA in which each user with good propagation conditions is allocated time and frequency resources, the number of inter-cell sequence reuses differs depending on the frequency bandwidth allocated. Thus, the base station apparatus needs to report the sequence number used by the user terminal for each frequency bandwidth allocated. In other words, the number of times of signaling increases.

On the other hand, it is possible, for example, to reduce signaling to the user terminal by grouping the sequences based on the minimum frequency bandwidth, or the minimum number of inter-cell reuses. However, in this case, the number of inter-cell reuses is restricted, so that the probability of sequence collision increases, thus possibly leading to reduced channel estimation accuracy and reduced reception quality measurement accuracy.

In particular, the reference signal used in channel quality estimation is expected to be assigned the same frequency bandwidth among the cells, so that the sequence collision is likely to occur.

Thus, in light of the problems described above, the object of the present invention is to provide a base station apparatus, a user apparatus, and a method of allocating a reference signal sequence that make it possible to reduce sequence collision among the cells without increasing signaling by the base station apparatus.

Means for Solving the Problem

In order to solve the problem as described above, a base station apparatus according to a present embodiment is provided which communicates with a user apparatus which transmits an uplink signal using a single-carrier scheme, including: a sequence-identifier determining unit which performs scheduling to allocate a frequency based on an uplink channel reception state of the user apparatus, and which determines a second sequence identifier for use by the user apparatus based on a first sequence identifier in a length of a reference signal sequence for transmitting in a maximum bandwidth in which the user apparatus can transmit; and a frequency bandwidth allocated to the user apparatus.

A user apparatus according to a present embodiment is provided which transmits an uplink signal using a single-carrier scheme and communicates with the base station apparatus, wherein the base station apparatus performs scheduling to allocate a frequency based on an uplink channel reception state of the user apparatus, the user apparatus further including a sequence-identifier determining unit which determines a second sequence identifier for use by the own user apparatus based on a first sequence identifier in a length of a reference signal sequence for transmitting in a maximum bandwidth in which the own user apparatus can transmit, and the frequency bandwidth allocated by the base station apparatus; and a reference signal generating unit which generates an uplink reference signal using the determined second sequence identifier.

A method of allocating a reference signal sequence according to the present embodiment is provided in a radio communications system which includes a user apparatus which transmits an uplink signal using a single-carrier scheme and a base station apparatus which communicates with the user apparatus, the method including the steps of: performing, by the base station apparatus, scheduling to allocate a frequency based on an uplink channel reception state of the user apparatus; determining, by the base station apparatus, a second sequence identifier for use by the user apparatus based on a first sequence identifier in a length of a reference signal sequence for transmitting in a maximum bandwidth in which the user apparatus can transmit, and a frequency bandwidth allocated to the user apparatus; determining, by the user apparatus, a second sequence identifier for use by the own user apparatus based on the first sequence identifier, and the frequency bandwidth allocated by the base station apparatus; generating, by the user apparatus, an uplink reference signal using the determined second sequence identifier; transmitting, by the user apparatus, the generated reference signal; and receiving, by the base station apparatus, an uplink reference signal transmitted from the user apparatus using the second identifier determined.

ADVANTAGE OF THE INVENTION

According to the embodiments of the present invention, in a system to which the E-UTRA is applied, a base station apparatus, a user apparatus, and a method of allocating a reference signal sequence are provided that make it possible to reduce sequence collision among cells without increasing signaling reported by the base station apparatus.

DESCRIPTION OF THE PREFERRED EMBODIMENTS

Figure 1:
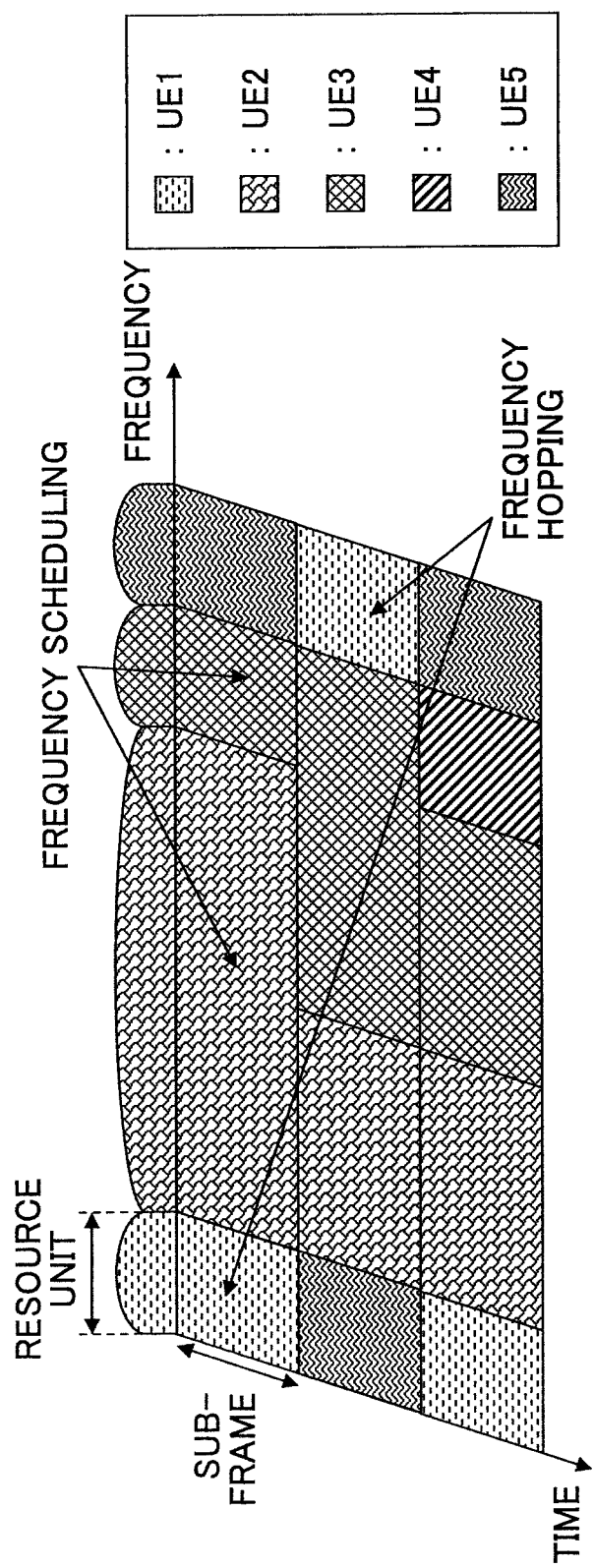
FIG. 1 illustrates a diagram for explaining a single carrier-FDMA.
Figure 2:
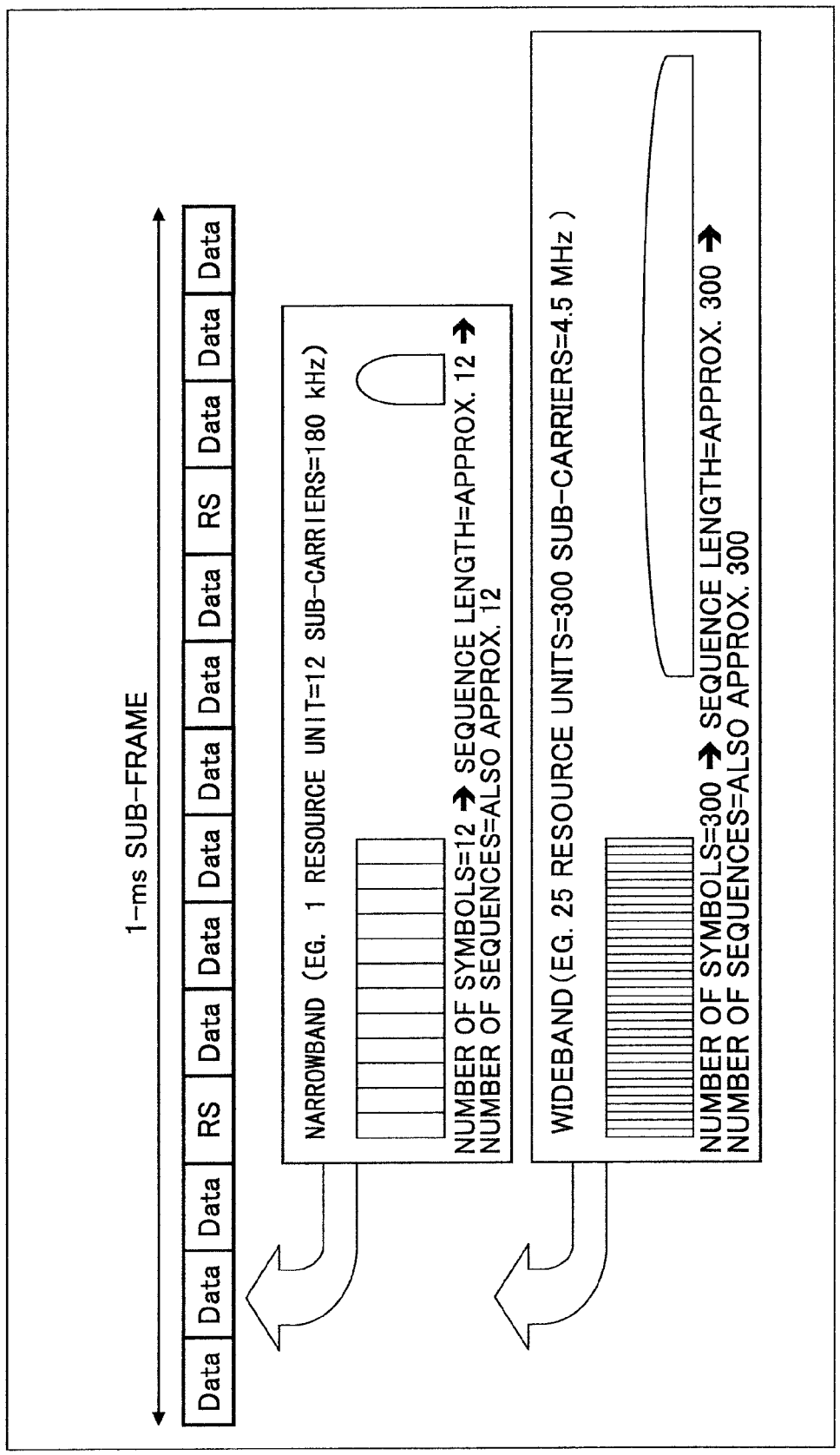
FIG. 2 illustrates a diagram for explaining a configuration of a reference signal in the single carrier-FDMA.

[Description of Notations]
   $50_k$ ($50_1$, $50_2$, $50_k$) cell
   $100_n$ ($100_1$, $100_2$, $100_3$, . . . , $100_n$) user apparatus
   102 OFDM signal demodulator
   104 uplink allocation permission signal demodulator/decoder
   106 broadcast channel demodulator/decoder
   108 other control signal and data signal demodulator/decoder
   110 radio frame number and sub-frame number counter
   114 memory for RS sequence number per bandwidth in RS sequence group
   116 RS generator for demodulation
   118 channel encoder
   120 data modulator
   122 SC-FDMA modulator
   $200_m$ ($200_1$, $200_2$, $200_3$, . . . , $200_m$) base station apparatus
   202 broadcast channel generator
   204 OFDM signal generator
   206 radio frame number, sub-frame number managing unit
   208 control signal generator for uplink allocation permission signal transmission
   210 memory for RS sequence number per bandwidth in RS sequence group
   214 RS generator for demodulation
   216 sync detector/channel estimator
   218 channel decoder
   220 coherent detector
   222 unit for estimating state of uplink channel per user
   224 scheduler
   300 access gateway apparatus
   400 core network Best Mode of Carrying Out The Invention A description is given below with regard to embodiments of the present invention. Throughout the drawings for explaining the embodiments, same letters are used for those parts having the same functions, so that repetitive explanations are omitted.

A radio communications system having user apparatuses and mobile station apparatuses according to an embodiment of the present invention is described with reference to FIG. 3. The user apparatuses may be called mobile station apparatuses.

The radio communications system 1000 is a system to which Evolved UTRA and UTRAN (also called Long Term Evolution or Super 3G) is applied, for example. The radio communications system 1000 includes a base station apparatus (eNB: eNode B) $200_m$ ($200_1$, $200_2$, $200_3$, . . . , $200_m$, where m is an integer greater than 0), and multiple user apparatuses $100_n$ ($100_1$, $100_2$, $100_3$, . . . , $100_n$, where n is an integer greater than 0) in communication with the base station apparatus $200_m$. The base station apparatus 200 is connected to an upper-layer station, for example, an access gateway apparatus 300, which is connected to a core network 400. The user apparatuses $100_n$ communicate with the base station apparatus $200_m$ via Evolved UTRA and UTRAN in any of cells $50_k$ ($50_1$, $50_2$, . . . $50_k$, where k is an integer greater than 0).

Here, it is assumed that the user apparatuses $100_n$ include those having a communications channel established with and in communication with any of the base station apparatuses $200_m$, as well as those not having a communications channel established with and not in communication with any of the base station apparatuses $200_m$.

The base station apparatus $200_m$ transmits a synchronization (sync) signal. The user apparatus $100_n$, which is located in any of cells $50_k$ ($50_1$, $50_2$, $50_3$, . . . $50_k$, where k is an integer greater than 0), conducts, based on the sync signal, a cell search in which a cell with radio quality which is good for the own station is detected at the time of turning on the power, or during intermittent reception during communications. In other words, the user apparatus $100_n$ detects symbol and frame timings using the sync signal and detects cell-specific information such as a cell ID (cell-specific scramble code generated from the cell ID) or a group of cell IDs (below-called cell ID group).

Here, the cell search is performed for both user apparatuses $100_n$ which are in communications and those which are not in communications. For example, the cell search for those in communications includes a cell search for detecting a cell of the same frequency and a cell search for detecting a cell of a different frequency. Moreover, the cell search for those not in communications includes a cell search at the time of turning on the power and a cell search in a standby mode, for example.

Below, base station apparatuses $200_m$ ($200_1$, $200_2$, $200_3$, ..., $200_m$) have the same configuration, function, and status. Thus, unless otherwise indicated, they will be explained below as the base station $200_m$. Below, the user apparatuses $100_n$ ($100_1$, $100_2$, $100_3$, ..., $100_n$) have the same configuration, function, and status. Thus, unless otherwise indicated, they will be explained below as the user apparatus $100_n$. Below, cells $50_k$ ($50_1$, $50_2$, $50_3$, ..., $50_k$) have the same configuration, function, and status. Thus, unless otherwise indicated, they will be described below as the cell $50_k$.

For the radio communications system 1000, the OFDMA (Orthogonal Frequency Division Multiple Access) is applied for downlink, while the SC-FDMA (Single Carrier-Frequency Division Multiple Access) is applied for uplink as radio access schemes. As described above, the OFDM is a scheme for dividing a frequency band into multiple narrow frequency bands (sub-carriers) and overlaying data onto the respective frequency bands for transmission. The SC-FDMA is a transmission scheme which divides a frequency bandwidth and transmits using different frequency bands among multiple user apparatuses to make it possible to reduce interference between the user apparatuses.

Here, communication channels in Evolved UTRA and UTRAN are described.

In downlink, a PDSCH (physical downlink shared channel), which is shared for use by the user apparatuses $100_n$, and a downlink control channel for LTE are used. In downlink, transport format information and user apparatus information mapped to the physical downlink shared channel, transport format information and user apparatus information mapped to the physical downlink shared channel, and acknowledgement information on the physical uplink shared channel, etc., are reported using the downlink control channel for LTE, while user data are transmitted using the physical downlink shared channel.

Moreover, in downlink, the base station apparatus 200*m* transmits a sync signal for the user apparatus $100_n$ to conduct the cell search.

For uplink, a PUSCH (Physical Uplink Shared Channel) which is shared for use by the user apparatuses $100_n$ and an uplink control channel for LTE are used. There are two types of uplink control channels, a channel which is time multiplexed with the physical uplink shared channel and a channel which is frequency multiplexed with the same.

In uplink, downlink quality (Channel Quality Indicator: CQI) information for use in downlink physical shared channel scheduling, AMC (Adaptive Modulation and Coding), and downlink physical shared channel acknowledgement (HARQ ACK) information are transmitted using the uplink control channel for LTE. Moreover, user data are transmitted using the physical uplink shared channel.

In the physical uplink control channel, in addition to the CQI and acknowledgement information, scheduling requests for requesting resource allocation of the uplink shared channel, and release requests in persistent scheduling may be transmitted. Here, the resource allocation of the uplink shared channel means the base station apparatus reporting to the user apparatus that communications may be conducted using the uplink shared channel in a subsequent sub-frame using the physical downlink control channel of a sub-frame.

In the radio communications system according to the present embodiment, when a small number of sequences is used for the reference signal (RS), the sequence is reused among the cells according to the allocated frequency bandwidth (the sequence length of the reference sequence). Below, the number of sequence reuses among the cells is called the number of inter-cell reuses. In the present embodiment, a case is described of applying a CAZAC (Constant Amplitude and Zero Auto-Correlation) sequence as a sequence having a small number of sequences, but this is non-limiting, so that other sequences may be applied. The CAZAC sequence is superior in code auto-correlation and cross-correlation characteristics. Thus, high-accuracy channel estimation is achieved, making it possible to improve demodulation accuracy significantly over the use of the PN sequence.

In other words, in the radio communications system according to the present embodiment, the number of inter-cell reuses is applied to the reference signal using the CAZAC sequence according to the allocated frequency bandwidth (sequence length of the reference sequence). Thus, the larger (wider) the allocated frequency bandwidth, the larger the number of sequences with inter-cell reuse, thus making it possible to significantly reduce the probability of collision between sequences used among the cells. For example, for one resource unit (or the bandwidth of 180 kHz), the number of inter-cell reuses is 12. For 25 resource units (or the bandwidth of 4.5 MHz), the number of inter-cell reuses is 12×25=300. In general, for N (where N is an integer, N>0) resource units (or the bandwidth of 0.18×N MHz), the number of inter-cell reuses is in the order of 12×N.

Moreover, rather than reporting, to the user apparatus $100_n$, a sequence number of an uplink reference signal to be used (or a sequence number of an uplink reference signal, which the user apparatus $100_n$ is set to use), the base station apparatus $200_m$ according to the present embodiment, reports, as the information to be reported, a sequence number of a reference signal with a maximum sequence length as a first sequence identifier. Here, the sequence number of the reference signal with the maximum sequence length is a sequence number in the sequence length of the reference signal transmitted in the maximum bandwidth in which the user apparatus can transmit. For example, the base station apparatus $200_m$ stores in advance the sequence number which the user is set to use, in association with the maximum bandwidth in which the user apparatus $100_n$ can transmit. The sequence number is a cell-specific value which is allocated in advance so as not to overlap between the cells. For example, it is allocated at the time of installing the base station apparatus $200_m$.

The base station $200_m$ determines the sequence number of the reference signal with a different sequence length based on the sequence number of the reference signal with the largest sequence length that is reported to the user apparatus $100_n$. More specifically, when the system bandwidth is 5 MHz, a bandwidth which may be allocated to one user is 4.5 MHz, due to the need to remove a guard band. For the 4.5 MHz, which corresponds to 25 resource units, the number of inter-cell reuses is 12×25=300. The base station apparatus $200_m$ reports, to the user apparatus $100_n$, the sequence number used by the own base station apparatus out of 300 sequence numbers. For example, as the sequence number of a reference signal with the largest sequence length, #200 is reported.

The base station apparatus $200_m$ determines, as a second sequence identifier, the sequence number used in the user apparatus $100_n$ based on the bandwidth allocated to the user apparatus $100_n$ through scheduling and the sequence number of the reported maximum-sequence length reference signal. For example, modulo (the number of sequences allocatable to the user apparatus $100_n$ that is determined based on the bandwidth allocated to the user apparatus $100_n$) is calculated on the sequence number of the reported maximum sequence length, which calculated value is set to be the sequence number used in the user apparatus $100_n$. For example, as a result of the scheduling, it is determined to allocate a 1.8 MHz bandwidth to the user apparatus 100*n*. The 1.8 MHz corresponds to 10 resource units, so that the number of sequences allocatable to the user apparatus $100_n$ is 12×10=120. The base station apparatus $200_m$ determines the sequence number 200%120=80, which is used in the user apparatus $100_n$, using the number of sequences 120 allocatable to the user apparatus $100_n$ that is determined based on the bandwidth allocated to the user apparatus $100_n$, and the sequence number #200 of the reported maximum-sequence length reference signal. Here, "%" is a modulo operator. In general, when the maximum-sequence length sequence number is #M, the sequence number used when the bandwidth allocated to the user apparatus $100_n$ is N resource units is determined as M % (N×12) using a modulo operation. The base station apparatus $200_m$ receives a reference signal transmitted from the user apparatus $100_n$ via a sequence corresponding to the determined sequence number.

The user apparatus $100_n$ performs the same operation as the base station apparatus $200_m$ based on the sequence number of the maximum-sequence length reference signal that is reported by the base station apparatus $200_m$. For example, the user apparatus $100_n$ determines the sequence number to be used in the own user apparatus $100_n$ based on the reported sequence number of the maximum-sequence length reference signal and the number of sequences allocatable to the own user apparatus $100_n$ that is determined based on the bandwidth allocated to the own user apparatus $100_n$ through scheduling using the base station apparatus $200_m$. Here, the bandwidth allocated to the own user apparatus $100_n$ and the location thereof is reported in advance by the base station apparatus $200_m$ in the downlink control channel. For example, modulo (the number of sequences allocatable to the own user apparatus $100_n$ that is determined based on the bandwidth allocated to the own user apparatus $100_n$) is calculated on the sequence number of the reported maximum sequence length, which calculated value is set to be the sequence number used in the own user apparatus $100_n$.

For example, the user apparatus $100_n$ is informed that a 1.8 MHz bandwidth has been allocated as a result of scheduling by the base station apparatus $200_m$. The 1.8 MHz corresponds to 10 resource units, so that the number of sequences allocatable to the own user apparatus $100_n$ is 12×10=120. The user apparatus $100_n$ determines the sequence number 200%120=80 to be used in the own user apparatus $100_n$ based on the reported sequence number #200 of the maximum-sequence length reference signal and the number of sequences 120 allocatable to the own user apparatus $100_n$ that is determined based on the bandwidth allocated to the own user apparatus $100_n$. The user apparatus $100_n$ generates a reference signal using a sequence corresponding to the determined sequence number and transmits the same.

Next, a base station apparatus $200_m$ according to the present embodiment is described with reference to FIG. 4.

The base station apparatus $200_m$ according to the present embodiment includes a broadcast channel generator 202, an ODFM signal generator 204, a radio frame number and sub-frame number managing unit 206, a control signal generator for uplink allocation permission signal transmission 208, a memory for RS sequence number per bandwidth 210, an RS generator for demodulation 214, a sync detector—channel estimator 216, a channel decoder 218, a coherent detector 220, a unit for estimating the state of uplink channel per user 222, and a scheduler 224. The broadcast channel generator 202, the ODFM signal generator 204, the radio frame number and sub-frame number managing unit 206, and the control signal generator for uplink allocation permission signal transmission 208 constitute the transmitter, while the memory for RS sequence number per bandwidth 210, the RS generator for demodulation 214, the sync detector-channel estimator 216, the channel decoder 218, the coherent detector 220, the unit for estimating the state of uplink channel per user 222, and the scheduler 224 constitute the receiver.

At the time of cell design (base station establishment), a maximum sequence-length RS sequence identifier, in other words, a sequence number in the sequence length of RS for transmitting in the maximum bandwidth in which the user apparatus 100 can transmit, for example the sequence number (RS number), is allocated to each cell. For example, this may be set to be reported from an upper-layer station, more specifically the access gateway apparatus 300.

The allocated maximum sequence-length RS number is input to the broadcast channel generator 202 and the memory for RS sequence number per bandwidth 210.

The broadcast channel generator 202 generates a broadcast channel which includes the input maximum sequence length RS number and the below-described radio frame number, and a system frame number input by the radio frame number and sub-frame number managing unit 206, and inputs the same to the OFDM signal generator 204. The OFDM signal generator 204 generates an OFDM signal including a broadcast channel and inputs the same into the radio transmitter. As a result, the maximum sequence length RS number is reported to all users within the cell using the broadcast channel.

On the other hand, the uplink channel transmitted from the user apparatus $100_n$ is input to the sync detector—channel estimator 216, the coherent detector 220, and the unit for estimating the state of uplink channel per user 222.

The sync detector and channel estimator 216 performs sync detection on the input received signal, estimates the received timing, performs channel estimation based on the demodulation reference signal (RS) input by the below-described RS generator for demodulation 214, and inputs the result to the coherent detector 220.

The coherent detector 220 performs coherent detection on the received signal based on the channel estimation result as well as the allocated frequency and bandwidth input by the below-described scheduler, and inputs the demodulated received signal to the channel decoder 218. The channel decoder 218 decodes the demodulated received signal input, and generates reproduced data signal corresponding to an allocated user number which is input by the scheduler 224. The reproduced data signal generated is transmitted to the network.

Moreover, the unit for estimating the uplink channel state per user 222 estimates the channel state based on the received signal input and inputs the result of estimating the state of the uplink channel per user to the scheduler 224.

The scheduler 224 performs, for example, frequency scheduling based on the inputted result of the estimating of the state of the uplink channel per user and QoS (e.g., required data rate, buffer state, required error rate, delay) of each user, inputs the allocated frequency and bandwidth to the control signal generator for uplink allocation permission signal transmission 208, the memory for RS sequence number per bandwidth 210, and the coherent detector 220, and inputs the allocated user number to the control signal generator for uplink allocation permission signal transmission 208 and the channel decoder 218.

The radio frame number, and sub-frame number managing unit 206 manages the radio frame number and the sub-frame number, inputs the system frame number into the broadcast channel generator 202, and inputs the radio frame number and the sub-frame number into the memory for RS sequence number per bandwidth 210.

The memory for RS sequence number per bandwidth 210 determines the sequence number of other sequence-length reference signals based on the maximum sequence length reference signal sequence number. More specifically, if the maximum sequence length sequence number is #M, when the bandwidth allocated to the user apparatus $100_n$ is N resource units (or when N resource units are allocated to the user apparatus $100_n$), the sequence number used by the user apparatus $100_n$ is determined using modulo operation as M % (N×12). The memory for RS sequence number per bandwidth 210 stores the relationship between the bandwidth allocated to the user apparatus $100_n$, and the RS sequence number. Moreover, the memory for the RS sequence per bandwidth 210 selects the RS sequence number corresponding to the bandwidth input by the scheduler 224, and inputs the selected RS sequence number into the RS generator for demodulation 214.

The RS generator for demodulation 214, based on the RS sequence number input from the memory for RS sequence number per bandwidth 210, generates the RS for demodulation and inputs the same into the sync detector-channel estimator 216.

The control signal generator for uplink allocation permission signal transmission 208 generates a control signal (a control signal for uplink allocation permission signal transmission) which includes allocated frequency and bandwidth and allocated user number that are input and inputs the same into the OFDM signal generator 204. The OFDM signal generator 204 generates an OFDM signal including the broadcast channel and inputs the same into the radio transmitter. As a result, using the downlink control channel, the same is reported to the user apparatus to be scheduled.

The OFDM signal generator 204 generates an OFDM signal which includes, besides the above-described broadcast channel and control channel, other downlink channels (e.g., downlink reference signal, data channel, paging channel), and inputs the same into the radio transmitter. As a result, the downlink channel is transmitted to the user.

Now a user apparatus $100_n$ according to the present embodiment is described with reference to FIG. 5.

The user apparatus $100_n$ according to the present embodiment includes an OFDM signal demodulator 102, an uplink allocation permission signal demodulator/decoder 104, a broadcast channel demodulator/decoder 106, another control signal, data signal demodulator/decoder 108, a radio frame number, sub-frame number counter 110, a memory for RS sequence number per bandwidth 114, a RS generator for demodulation 116, a channel encoder 118, a data modulator 120, and an SC-FDMA modulator 122. The OFDM signal demodulator 102, the uplink allocation permission signal demodulator/decoder 104, the broadcast channel demodulator/decoder 106, the other control signal, data signal demodulator/decoder 108, and the radio frame number sub-frame, number counter 110 constitute the receiver, while the memory for RS sequence number per bandwidth 114, the RS generator for demodulation 116, the channel encoder 118, the data modulator 120, and the SC-FDMA modulator 122 constitute the transmitter.

The user apparatus $100_n$ generates and transmits the transmission signal only when the allocated user number indicates the own user apparatus $100_n$ in the result of decoding of the uplink allocation permission signal.

The received signal from the base station apparatus $200_m$ is input to the OFDM signal demodulator 102 and undergoes demodulation, the control signal for the uplink allocation permission signal transmission is input to the uplink allocation permission signal demodulator/decoder 104, the broadcast channel is input to the broadcast channel demodulator/decoder 106, and control and data signals other than the control signal for uplink allocation permission signal transmission and the broadcast channel are input to the other control signal, data signal demodulator/decoder 108.

The broadcast channel demodulator/decoder 106 performs demodulation and decoding of the input broadcast channel, inputs the maximum sequence length RS number into the memory for RS sequence number per bandwidth 114, and inputs the system frame number into the radio frame number, sub-frame number counter 110.

The radio frame number, sub-frame number counter 110 counts the radio frame number and the sub-frame number, and inputs the same into the memory for RS sequence number per bandwidth 114.

The uplink allocation permission signal demodulator/decoder 104 performs demodulation and decoding on the input uplink allocation permission signal, inputs the allocated frequency to the SC-FDMA modulator 122, and inputs the allocated bandwidth to the memory for RS sequence number per bandwidth 114.

The memory for RS sequence number per bandwidth 114 determines the sequence number of other sequence-length reference signals based on the maximum sequence length reference signal sequence number. More specifically, the sequence number of other sequence-length reference signals is determined based on the maximum sequence length RS sequence number input by the broadcast channel demodulator and decoder 106, and the allocated bandwidth input by the uplink allocation permission signal demodulator and decoder 104. For example if the maximum sequence length sequence number is #M, when the bandwidth allocated to the user apparatus $100_n$ is N resource units (or when N resource units are allocated to the own user apparatus $100_n$), the sequence number used by the user apparatus $100_n$ is determined using modulo operation M % (N×12). Moreover, the memory for RS sequence number per bandwidth 114 stores the relationship between the bandwidth allocated to the own user apparatus $100_n$, and the RS sequence number. Moreover, the memory for RS sequence number per bandwidth 114 selects the determined RS sequence number, and the selected RS sequence number is input to the RS generator for demodulation 116.

The RS generator for demodulation 116 generates the RS for demodulation based on the selected RS sequence number and input the same into the SC-FDMA modulator 122.

On the other hand, the user data undergo channel encoding in the channel encoder 118, the channel-encoded data are modulated in the data modulator 120, and the modulated data are input into the SC-FDMA modulator 122.

The SC-FDMA modulator (DFT-spread OFDM) 122 modulates the input RS for demodulation and the modulated user data based on the allocated frequency and outputs a transmission signal.

Next, a radio communications system is described, to which base station apparatuses and user apparatuses according to another embodiment of the present invention are applied.

Figure 3:
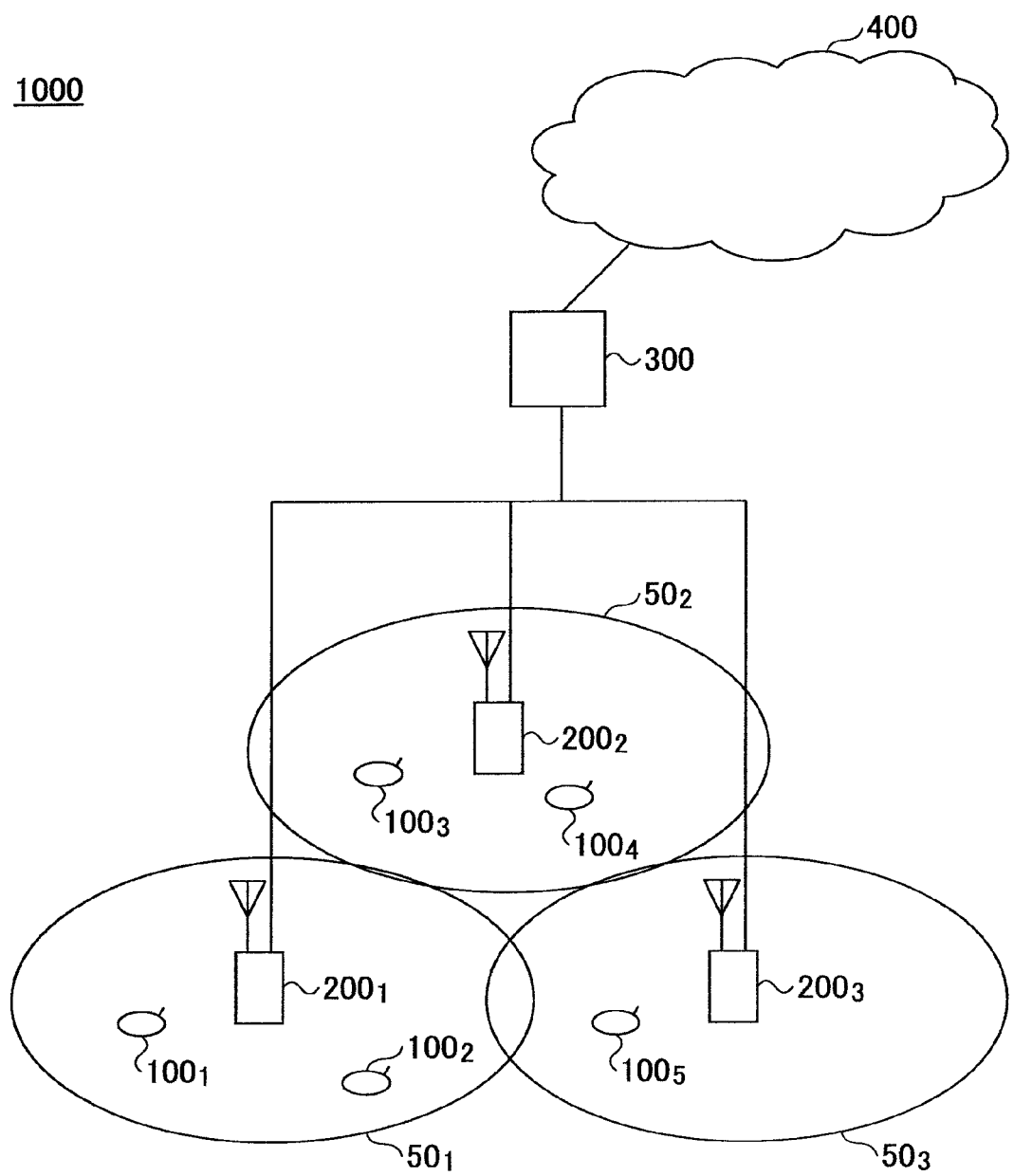
FIG. 3 is a block diagram illustrating a radio communications system according to an embodiment of the present invention.
Figure 4:
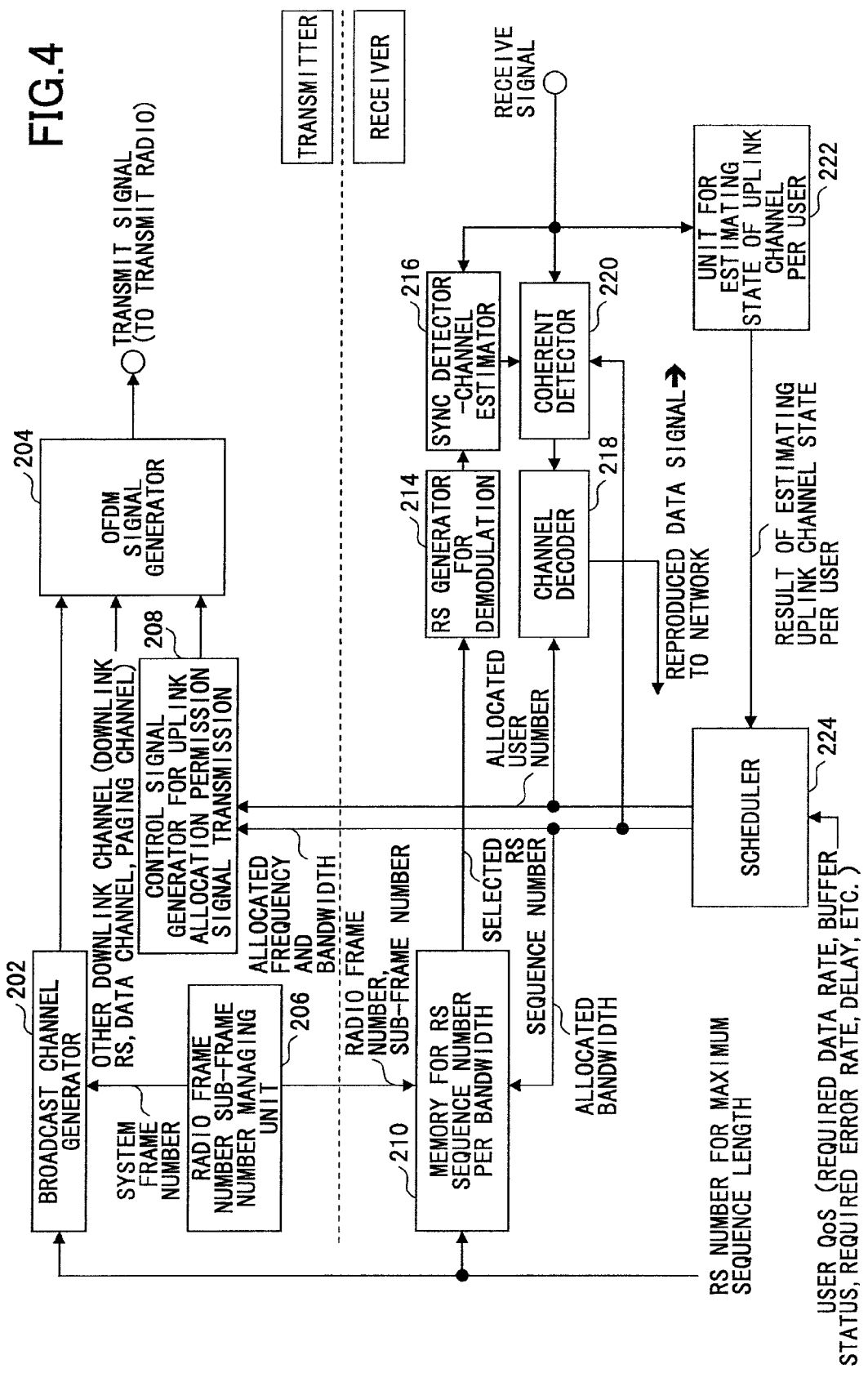
FIG. 4 is a partial block diagram illustrating a base station apparatus according to an embodiment of the present invention.
Figure 5:
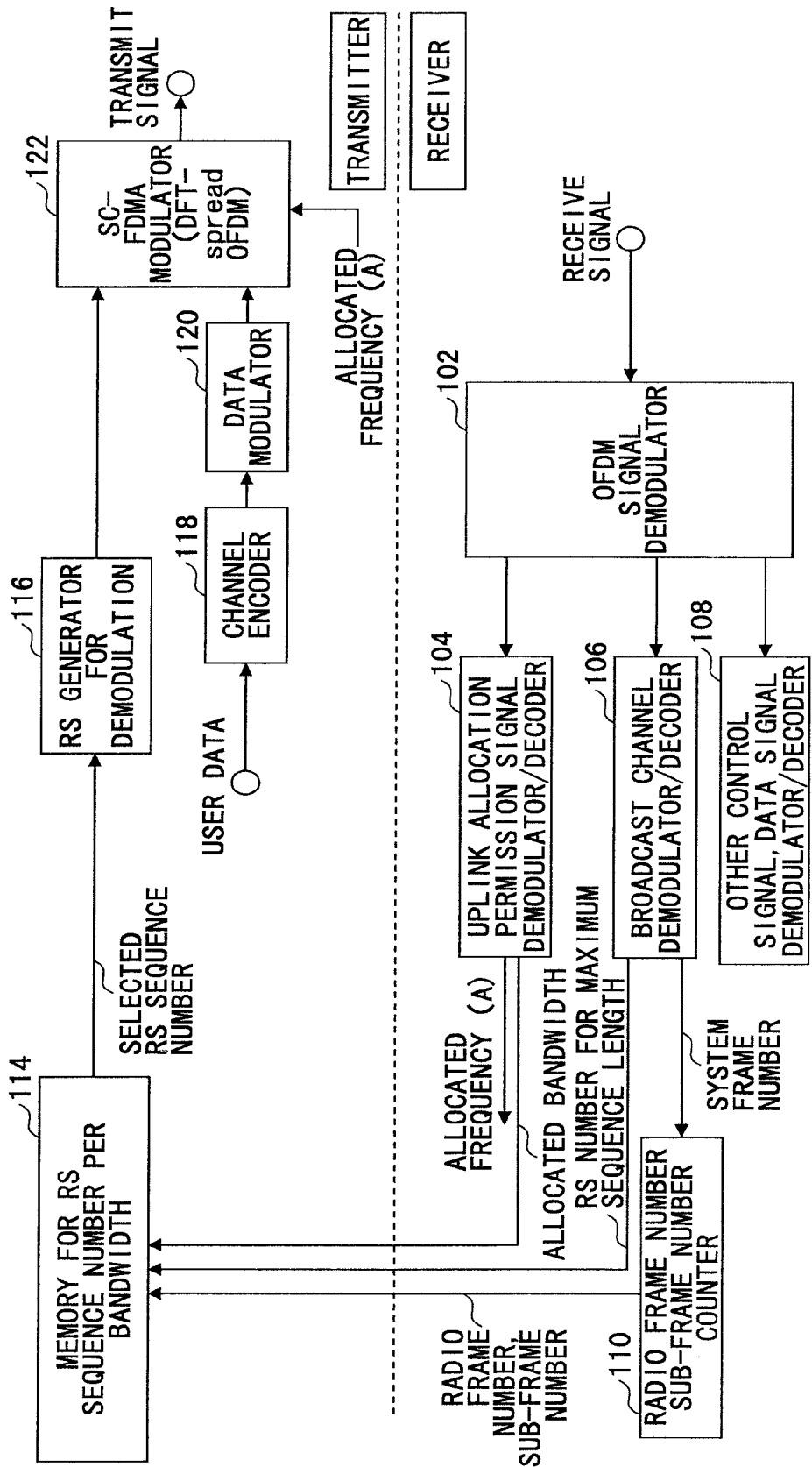
FIG. 5 is a partial block diagram illustrating a user apparatus according to an embodiment of the present invention.

The configuration of the radio communications system, the base station apparatuses, and the user apparatuses according to the present embodiment is the same as what is described with respect to FIGS. 3-5.

In the present embodiment, the cell ID of each cell is tied in advance to the maximum sequence-length sequence number used. In this case, in the base station apparatus $200_m$, which is described with reference to FIG. 4, the maximum sequence-length RS number is input into the memory for the RS sequence number per bandwidth 210, not into the broadcast channel generator 202. Such an arrangement as described above allows the process of reporting, in the broadcast channel, the maximum sequence-length sequence number to the user apparatus $100_n$, to be omitted.

Next is described a radio communications system to which base station apparatuses and user apparatuses according to a further embodiment of the present invention are applied i.

The configuration of the radio communications system, the base station apparatuses, and the user apparatuses according to the present embodiment is the same as what is described with respect to FIGS. 3-5.

In the present embodiment, each cell transmits, to the user allocated by the scheduler, control information indicating scheduling permission including the maximum sequence-length sequence number. In this case, in the base station apparatus 200, which is described with reference to FIG. 4, the maximum sequence-length RS number is input into the memory for the RS sequence number per bandwidth 210 and the unit for generating control information for uplink allocation permission signal transmission 208, not into the broadcast channel generator 202. The unit for generating the control information for uplink allocation permission signal transmission 208 generates control information including the maximum sequence-length RS number. Such an arrangement as described above makes it possible to reduce the number of times of reporting the maximum sequence-length sequence number, or in other words, the number of times of signaling.

Figure 6:
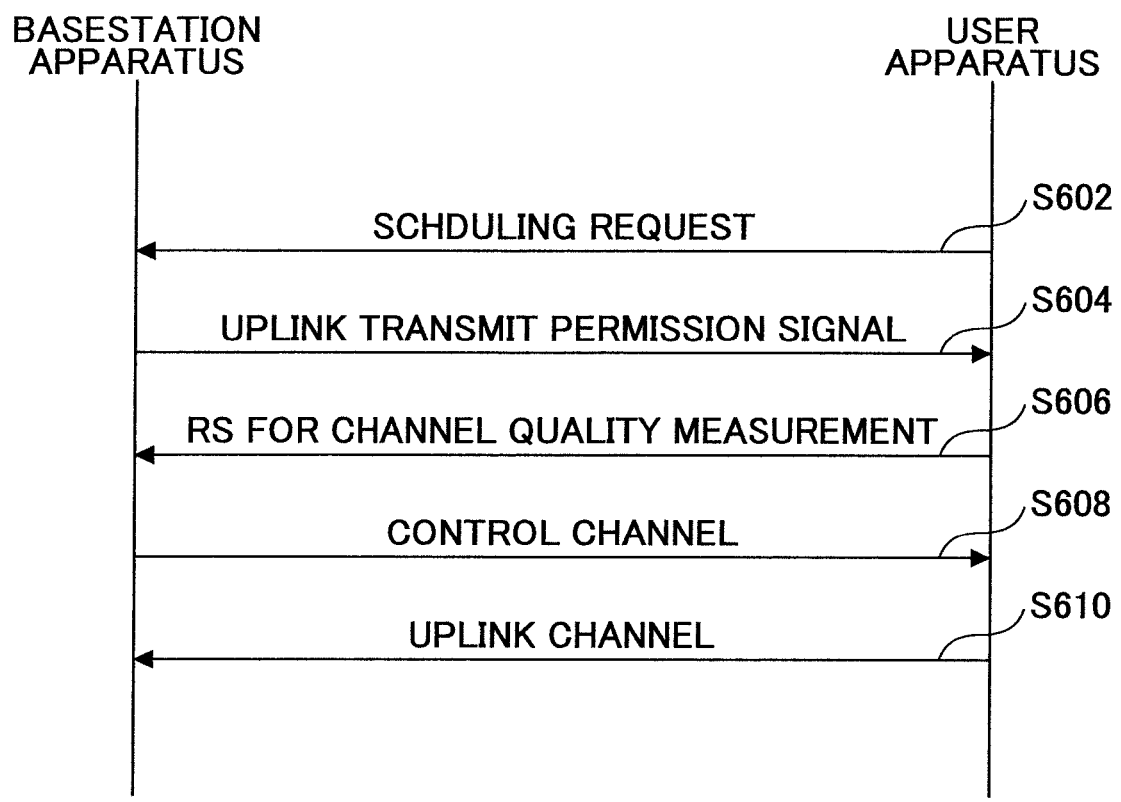
FIG. 6 is a flow diagram illustrating the process of the radio communications system according to an embodiment of the present invention.

A method of reporting the maximum sequence-length sequence number is described with reference to FIG. 6.

The user apparatus $100_n$ transmits a scheduling request to the base station apparatus $200_m$ (step S602). In other words, as described above, the scheduling request is performed to request resource allocation of an uplink shared channel.

The base station $200_m$ transmits control information indicating scheduling permission including the maximum-sequence length sequence number (step S604).

The user apparatus $100_n$ generates and transmits a reference signal for channel quality measurement (step S606).

The base station $200_m$ transmits a control channel (step S608).

The user apparatus $100_n$ transmits an uplink channel according to the control channel transmitted from the base station apparatus $200_m$.

In the E-UTRA, the base station apparatus $200_m$ performs scheduling to allocate various bandwidths to the user apparatus. Therefore, the number of sequences to be obtained may depend on the allocated bandwidth. According to the present embodiment, there is no need to report the sequence number used per bandwidth allocated to the user apparatus $100_n$, thus making it possible to reduce signaling. Moreover, the sequence number used in the user apparatus is determined based on the maximum sequence-length reference signal sequence number and on the number of sequences allocatable to the user apparatus that is determined based on the bandwidth allocated to the user.

In the above-described embodiments, examples in systems to which the Evolved UTRA and UTRAN (also called Long Term Evolution or Super 3G) is applied are described. However, the mobile apparatus, base station apparatus, and the method of allocating the reference signal sequences are applicable in all systems using FDMA (e.g., SC-FDMA) in uplink.

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person may understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-169793 filed on Jun. 27, 2007, the entire contents of which are hereby incorporated by reference.

The invention claimed is:

1. A base station apparatus which communicates with a user apparatus which transmits an uplink signal using a single-carrier scheme, the base station apparatus being configured to:
   perform scheduling to allocate a frequency based on an uplink channel reception state of the user apparatus, and
   determine a second sequence identifier for use by the user apparatus based on a first sequence identifier in a length of a reference signal sequence for transmitting in a maximum bandwidth in which the user apparatus can transmit, and a frequency bandwidth allocated to the user apparatus,
   wherein the base station apparatus comprises a receiver which receives an uplink reference signal transmitted from the user apparatus using the determined second sequence identifier.

2. The base station apparatus as claimed in claim 1, comprising, a reporting unit which reports the first sequence identifier to the user apparatus.

3. The base station apparatus as claimed in claim 2, wherein, the reporting unit transmits control information indicating scheduling permission that includes the first sequence identifier.

4. The base station apparatus as claimed in claim 1, wherein a cell ID of a cell and the first sequence identifier are associated.

5. The base station apparatus as claimed in claim 1, wherein the base station apparatus determines the second sequence identifier by determining the number of sequences allocatable to the user apparatus based on the frequency bandwidth allocated to the user apparatus and by determining a modulo of the number of sequences allocatable to the user apparatus in the first sequence identifier.

6. The base station apparatus as claimed in claim 1, comprising:
   a table associating, for the first sequence identifier, the second sequence identifier with the frequency bandwidth allocated to the user apparatus,
   wherein the base station apparatus refers to the table and determines the second sequence identifier.

7. The base station apparatus as claimed in claim 1, wherein the sequence is a CAZAC sequence.

8. A user apparatus which transmits an uplink signal using a single-carrier scheme and communicates with a base station apparatus, wherein
   the base station apparatus is configured to perform scheduling to allocate a frequency based on an uplink channel reception state of the user apparatus, the user apparatus is configured to determine a second sequence identifier for use by the user apparatus based on a first sequence identifier in a length of a reference signal sequence for transmitting in a maximum bandwidth in which the user apparatus can transmit, and the frequency bandwidth allocated by the base station apparatus; and the user apparatus comprises a reference signal generator which generates an uplink reference signal using the determined second sequence identifier.

9. A method of allocating a reference signal sequence in a radio communications system which includes a user apparatus which transmits an uplink signal using a single-carrier scheme and a base station apparatus which communicates with the user apparatus, the method comprising the steps of:

performing, by the base station apparatus, scheduling to allocate a frequency based on an uplink channel reception state of the user apparatus, determining, by the base station apparatus, a second sequence identifier for use by the user apparatus based on a first sequence identifier in a length of a reference signal sequence for transmitting in a maximum bandwidth in which the user apparatus can transmit, and a frequency bandwidth allocated to the user apparatus;

determining, by the user apparatus, a second sequence identifier for use by the user apparatus based on the first sequence identifier, and the frequency bandwidth allocated by the base station apparatus;

generating, by the user apparatus, an uplink reference signal using the determined second sequence identifier;

transmitting, by the user apparatus, the generated reference signal; and receiving, by the base station apparatus, an uplink reference signal transmitted from the user apparatus using the second identifier determined.

* * * * *